United States Patent [19]
Cox

[11] Patent Number: 5,807,047
[45] Date of Patent: Sep. 15, 1998

[54] CARGO TRANSPORT ASSEMBLY INCLUDING RETAINING BRACKET FOR CARGO SUPPORT BEAM

[75] Inventor: W. Leon Cox, Norood, N.C.

[73] Assignee: Collins and Aikman Products, Co., Charlotte, N.C.

[21] Appl. No.: 810,034

[22] Filed: Mar. 4, 1997

[51] Int. Cl.⁶ .................................................. B60P 7/15
[52] U.S. Cl. ........................ 410/152; 410/143; 410/144
[58] Field of Search .................................. 410/143, 144, 410/147, 152, 77; 248/200.1, 214, 218.1, 300

[56] References Cited

U.S. PATENT DOCUMENTS

| | | | |
|---|---|---|---|
| 1,597,091 | 8/1926 | McMahon . | |
| 2,467,681 | 4/1949 | McKinney | 410/152 |
| 3,051,099 | 8/1962 | Robertson | 410/152 X |
| 3,075,478 | 1/1963 | Elsner . | |
| 3,367,286 | 2/1968 | Jantzen | 410/147 X |
| 3,405,661 | 10/1968 | Erickson et al. | 410/89 X |
| 3,433,179 | 3/1969 | Sharp . | |
| 3,788,240 | 1/1974 | Nadherny | 410/152 X |
| 3,799,070 | 3/1974 | Munson | 410/149 |
| 4,067,263 | 1/1978 | Naffa et al. | 410/144 |
| 4,553,888 | 11/1985 | Crissy et al. | 410/144 |
| 4,932,817 | 6/1990 | Mattare | 410/152 |
| 4,982,922 | 1/1981 | Krause | 410/143 X |
| 5,028,184 | 7/1991 | Krause | 410/143 |
| 5,320,464 | 6/1994 | Long et al. | 410/144 |
| 5,338,137 | 8/1994 | Jensen . | |
| 5,370,482 | 12/1994 | Long | 410/152 X |
| 5,452,972 | 9/1995 | Adams | 410/89 |

FOREIGN PATENT DOCUMENTS

| | | | |
|---|---|---|---|
| 1189321 | 3/1965 | Germany | 410/144 |

*Primary Examiner*—Stephen Gordon
*Attorney, Agent, or Firm*—Myers Bigel Sibley & Sajovec, P.A.

[57] ABSTRACT

A retaining bracket is adapted to prevent an end portion of a cargo support beam supported between a pair of opposite walls of a cargo compartment from becoming dislodged. A plate is provided with an aperture and configured to permit the end portion of a cargo beam to pass therethrough and cooperate with a slot in an E-track mounted to a wall of a cargo compartment. A pair of spaced apart tabs are configured to cooperate with a respective slot on opposite sides of a slot in which a cargo beam end portion is cooperating. A pair of spaced apart flanges are configured to receive a beam end portion therebetween. A locking pin is configured to be removably inserted within flange apertures and an aperture in beam end portion to prevent the cargo beam from dislodging from its cooperating slot.

18 Claims, 4 Drawing Sheets

CARGO TRANSPORT ASSEMBLY INCLUDING RETAINING BRACKET FOR CARGO SUPPORT BEAM

FIELD OF THE INVENTION

The present invention relates generally to cargo support beams, and more particularly to elevated cargo support beams supported by the walls of a cargo compartment.

BACKGROUND OF THE INVENTION

Cargo beams are commonly used in rail cars, truck trailers, and other similar cargo compartments for supporting cargo above the compartment floor. It is desirable to elevate cargo for various reasons, such as when the cargo is not suitable for stacking, not suitable for stacking above a certain height, or when it is necessary to increase the load carrying ability of the compartment. Typically, a cargo beam of this type is designed to be suspended from the side walls of a cargo compartment via a connector at each end of the beam. These connectors are inserted within slots in opposing horizontal tracks mounted to each side wall. Because it is desirable to be able to quickly install and remove these cargo beams, the connector at each end of a beam has a configuration that is designed to be inserted within a slot and held therein by gravity.

Unfortunately, many cargo compartments, particularly truck trailers, are constructed from flexible materials such as fiberglass and aluminum, and tend to flex and twist when in motion. This often causes cargo beams attached to the sidewalls therein to become dislodged from their supporting slots as the walls bow and flex. In addition, motion-induced vibrations can also cause these cargo beam connectors to become dislodged from their slots. Often cargo supported upon these elevated beams is of a lightweight nature and insufficient to help maintain the connectors within their slots.

When these cargo beams become dislodged, they are often damaged, rendering them unusable. Furthermore, the cargo being supported is often damaged as well as cargo underneath the supported cargo. In all cases, beam dislodgement results in unnecessary expenses. Heretofore, efforts to prevent cargo beams from becoming dislodged have added significantly to the cost of the cargo beams and/or to the time required to install and remove the cargo beams.

SUMMARY OF THE INVENTION

It is an object of the present invention to prevent cargo beams of the type described above from becoming dislodged from their supporting slots when the cargo compartment is subjected to vibrations, flexing, and the like.

It is another object of the present invention to prevent cargo beams of the type described above from becoming dislodged without significantly adding to the cost and without significantly increasing the time required to install and remove the cargo beams.

These and other objects are accomplished, according to the present invention, by a retaining bracket adapted to prevent an end portion of a cargo support beam supported between a pair of opposite walls of a cargo compartment from becoming dislodged. A pair of longitudinally extending tracks, referred to as "E-tracks", are mounted on the walls in opposing horizontal relationship to each other. Each E-track has a plurality of spaced apart slots along its longitudinal extent. Each end portion of a beam cooperates with a slot in a respective one of the opposing E-tracks to thereby support the beam in a horizontal position between the tracks. Each beam typically has a web portion adjacent each end portion, and has an aperture therethrough.

The retaining bracket has a plate with an aperture formed through a medial portion thereof and has opposing front and rear faces. The plate aperture is configured to permit the end portion of a beam to pass therethrough and cooperate with a slot in an E-track. A pair of spaced apart tabs extend outwardly from the rear face of the plate with the plate aperture therebetween. The tabs may be generally perpendicular to the plate rear face. Each tab is configured to cooperate with a respective slot on opposite sides of the slot in which the beam end portion is cooperating with, and thereby secure the plate to the E-track. Each tab may have an upper and a lower notched portion configured to engage a respective upper and lower portion of the E-track slot in which the tab cooperates. A pair of spaced apart flanges extend outwardly from the plate front face with the plate aperture therebetween. The flanges may be generally perpendicular to the plate front face. The flanges are configured to receive a beam end portion therebetween, and each flange has an aperture therethrough.

A locking pin having opposite ends is configured to be removably inserted within the flange apertures and to extend between the pair of flanges and through an aperture in the end portion of a cargo support beam. The locking pin prevents the beam end portion from dislodging from its cooperating slot. The retaining bracket may include means for preventing the locking pin from inadvertently disengaging from the flange and web apertures, such as an arcuate member cooperating with a groove adjacent one of the locking pin ends. The retaining bracket may also include means for retaining the locking pin adjacent the plate when the locking pin is not inserted within the flange and web portion apertures. This is to prevent the locking pin from becoming misplaced when not in use.

The present invention is advantageous in that cargo beams are prevented from becoming dislodged from an E-track slot as a result of vibrations and flexing of the cargo compartment. Accordingly, dramatic cost savings can be realized by the reduction in damage to both the cargo and to the cargo support beams.

DETAILED DESCRIPTION OF PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
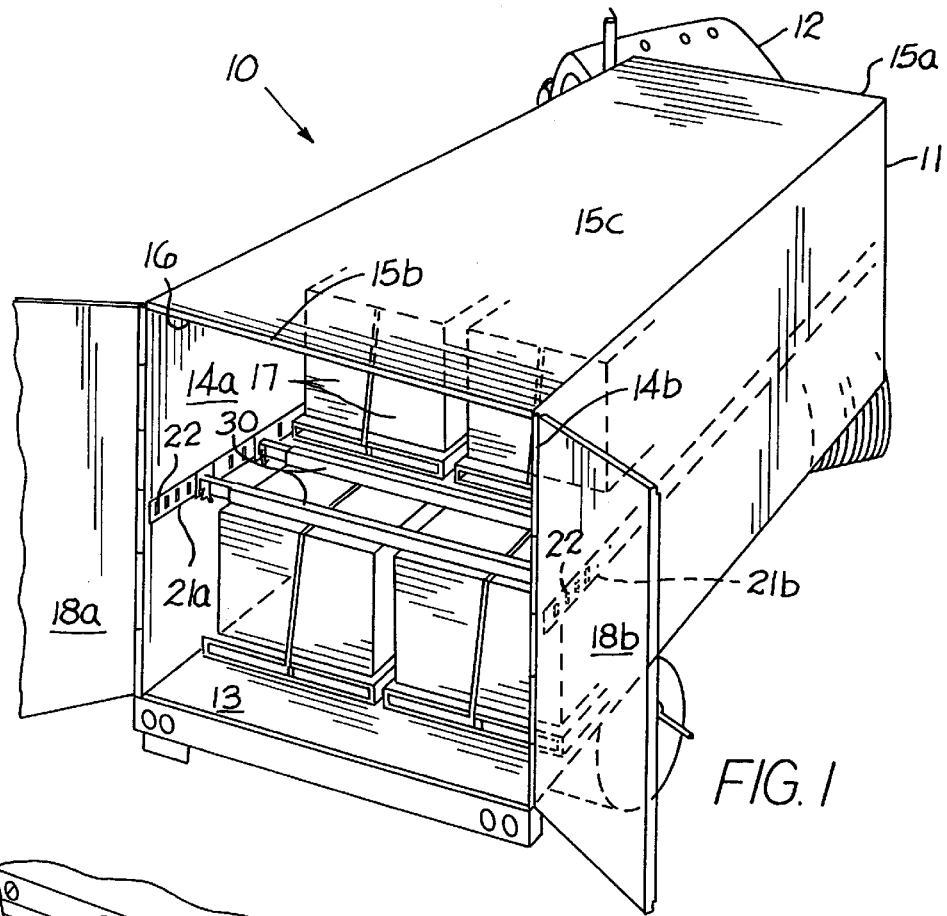
FIG. 1 illustrates a cargo compartment having a plurality of cargo support beams supported via slots in a pair of horizontal E-tracks.

Referring now to FIG. 1, the present invention is illustrated in use within the cargo compartment of a truck and trailer combination 10. The trailer 11, which is configured to be pulled by the truck 12, has a generally rectangular shape and comprises a floor 13, opposing side walls 14a,14b, opposing front and rear end portions 15a,15b, and a top portion 15c, which define a cargo compartment 16 for transporting cargo 17. As is conventional, the rear end portion 15b comprises a pair of hinged doors 18a,18b which are maintained in a closed position when transporting the cargo. However, it is understood that the rear end portion 15b may comprise various types of doors such as roll-up doors, or even no doors, without departing from the spirit and intent of the present invention. A pair of longitudinally extending tracks (hereinafter referred to as "E-tracks") 21a, 21b are mounted horizontally on the side walls 14a,14b of compartment 16 at the same elevation above the floor 13, and in opposing relationship to each other. Each E-track 21a,21b has multiple spaced apart slots 22 arranged along the longitudinal extent thereof for receiving and cooperating with a cargo beam end portion. In a typical embodiment, as shown in FIG. 1, multiple cargo beams 30 are suspended between opposing E-tracks 21a,21b for supporting cargo 17 above the floor 13.

Figure 2:
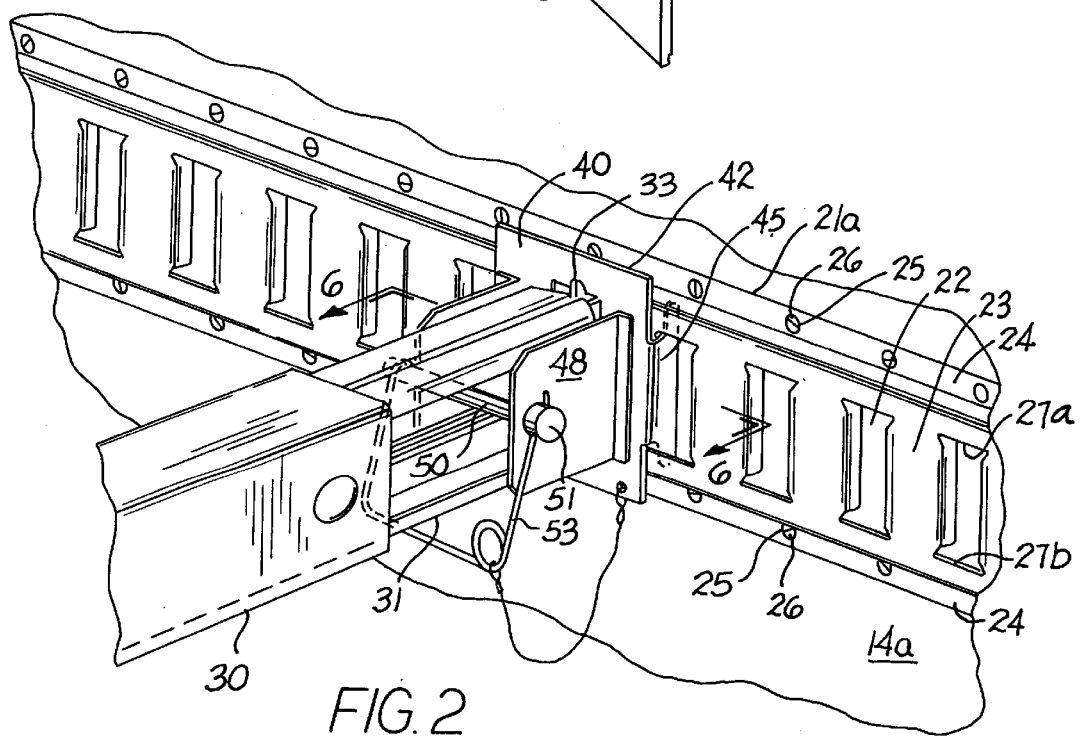
FIG. 2 illustrates a cargo support beam end portion and retaining bracket supported from an E-track, in accordance with the present invention.

Referring now to FIG. 2 the horizontally extending E-tracks 21a,21b will now be described. Only one E-track 21a is illustrated in FIG. 2, but it shall be understood that the opposite E-track 21b is identical. The E-track 21a has a top portion 23 in which are formed a plurality of spaced apart slots 22. A pair of flanges 24 extend along the top portion 23 of the E-track and have a plurality of spaced apart mounting holes 25 therein. The E-track 21a is secured to a compartment wall 14a by suitable fastening means, such as wood screws 26, extending through mounting holes 25. Each slot 22 includes an upper edge 27a and a lower edge 27b.

Still referring to FIG. 2, a cargo support beam 30 and a retaining bracket 40 for preventing the beam from becoming dislodged from its supporting E-track slot 22, according to the present invention, are illustrated. Each cargo support beam 30 has opposite end portions 31 configured to engage a respective E-track slot 22 and support the beam therefrom. Typically, each end portion 31 has telescoping characteristics so that a beam can be used within cargo compartments of varying width. Only one end portion 31 and retaining bracket 40 are illustrated in FIG. 2, but it shall be understood that the end portion opposite the illustrated one is identical in structure and function. The function of the retaining bracket 40 is to prevent the beam end portion 31 from becoming dislodged from its supporting E-track slot 22 as a result of the cargo compartment 16 encountering vibrations, sudden jolts, and the like during transit. In the illustrated embodiment, the retaining bracket 40 does not support the beam 30 and does not support any load on the cargo beam by the cargo.

Figure 3:
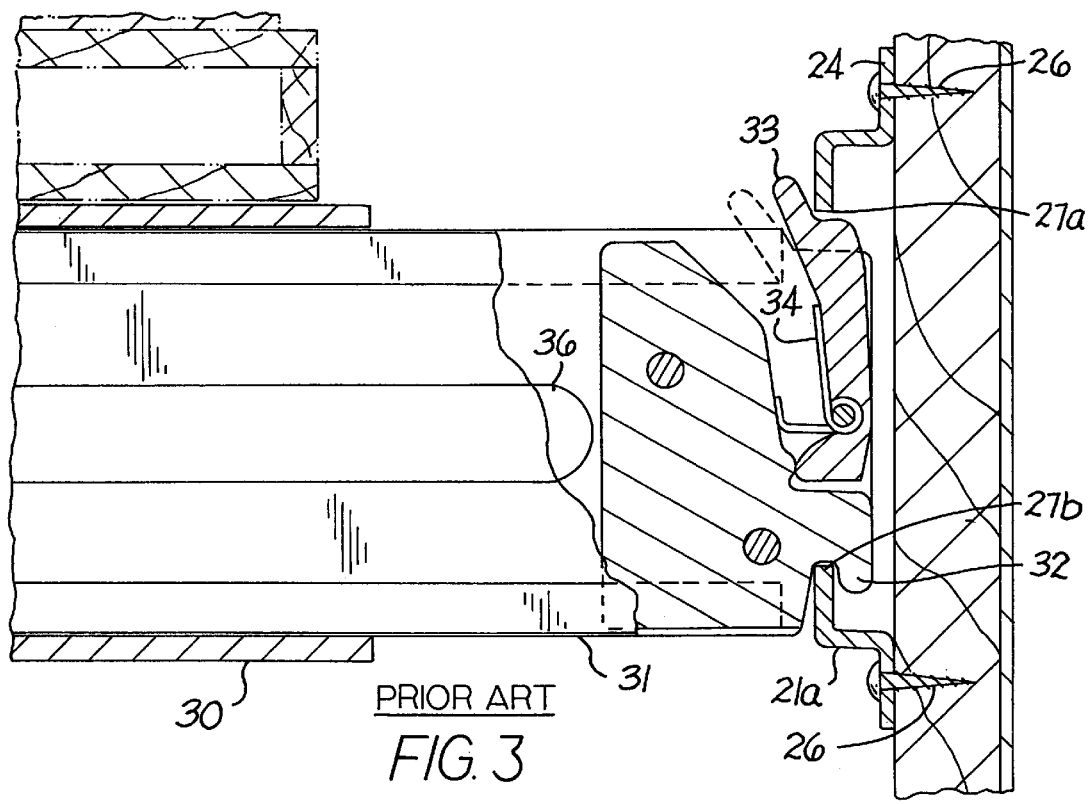
FIG. 3 is a side view of a prior art cargo beam end portion cooperating with an E-track slot.

Referring now to FIG. 3, a prior art cargo beam with which the present invention is used, is illustrated. Each beam end portion 31 has a lower tongue 32 secured thereto or integral therewith, as illustrated. The lower tongue 32 is configured to be inserted into the E-track slot 22 and to rest upon the lower edge 27b of the slot. The lower tongue 32 extends in a downwardly direction as illustrated so as to resist removal from the slot when subjected to forces along the longitudinal direction of the cargo beam 30. Each beam end portion 31 also has an upper tongue 33 which is biased against the beam end portion 31 by spring 34. The upper tongue 33 engages the upper edge 27a of slot 22. Prior to the invention of the retaining bracket 40, the purpose of the upper tongue 33 was to facilitate maintaining the beam end portion 31 within a slot 22 by biasing against the upper edge 27a of the slot, as illustrated in FIG. 3. When a retaining bracket 40, according to the present invention, is used, the upper tongue 33 serves no purpose.

Figure 4:
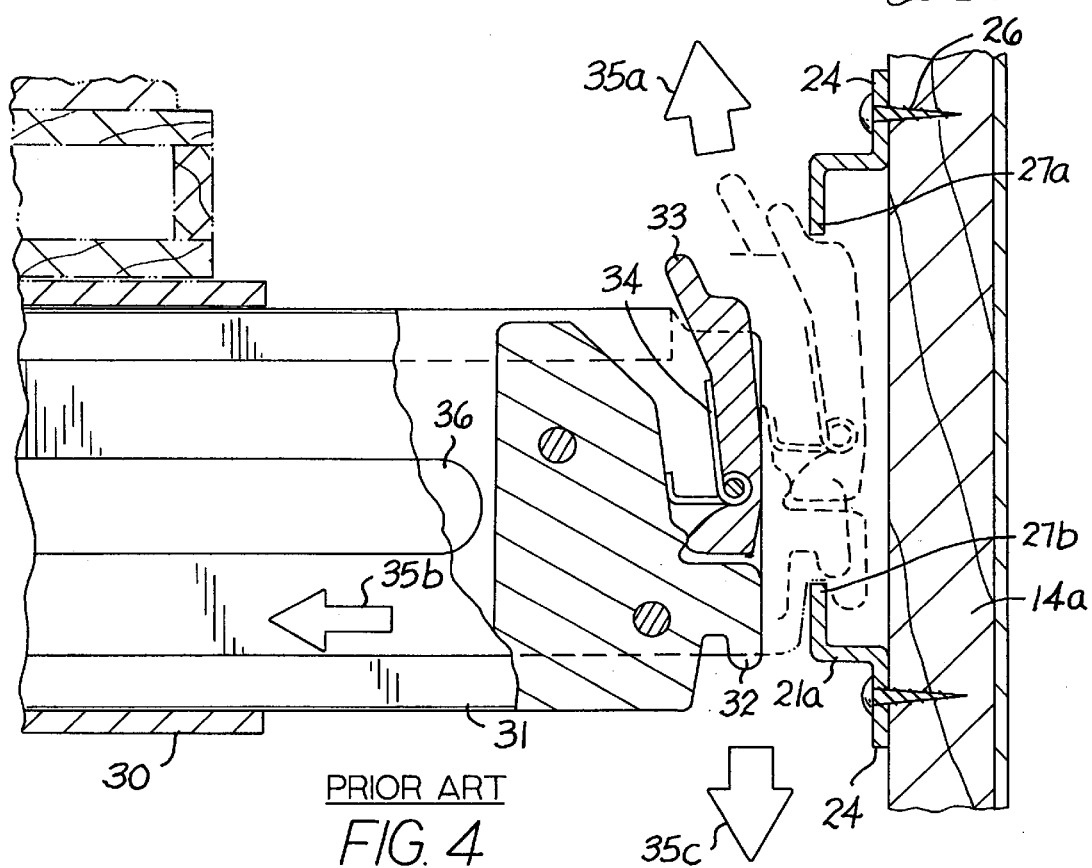
FIG. 4 is a side view of a prior art cargo beam end portion becoming dislodged from an E-track slot.

Referring now to FIG. 4, the problems encountered with prior art cargo beams having end connectors of the type described above are illustrated. When subjected to various vibrations and forces (indicated by arrows 35a,35b,35c) during transit, the lower tongue 32 has a tendency to "jump" around within its slot 22, and thereby increases the likelihood of becoming dislodged from the slot. This is especially true when loads supported by the beam 30 are lightweight.

Figure 5:
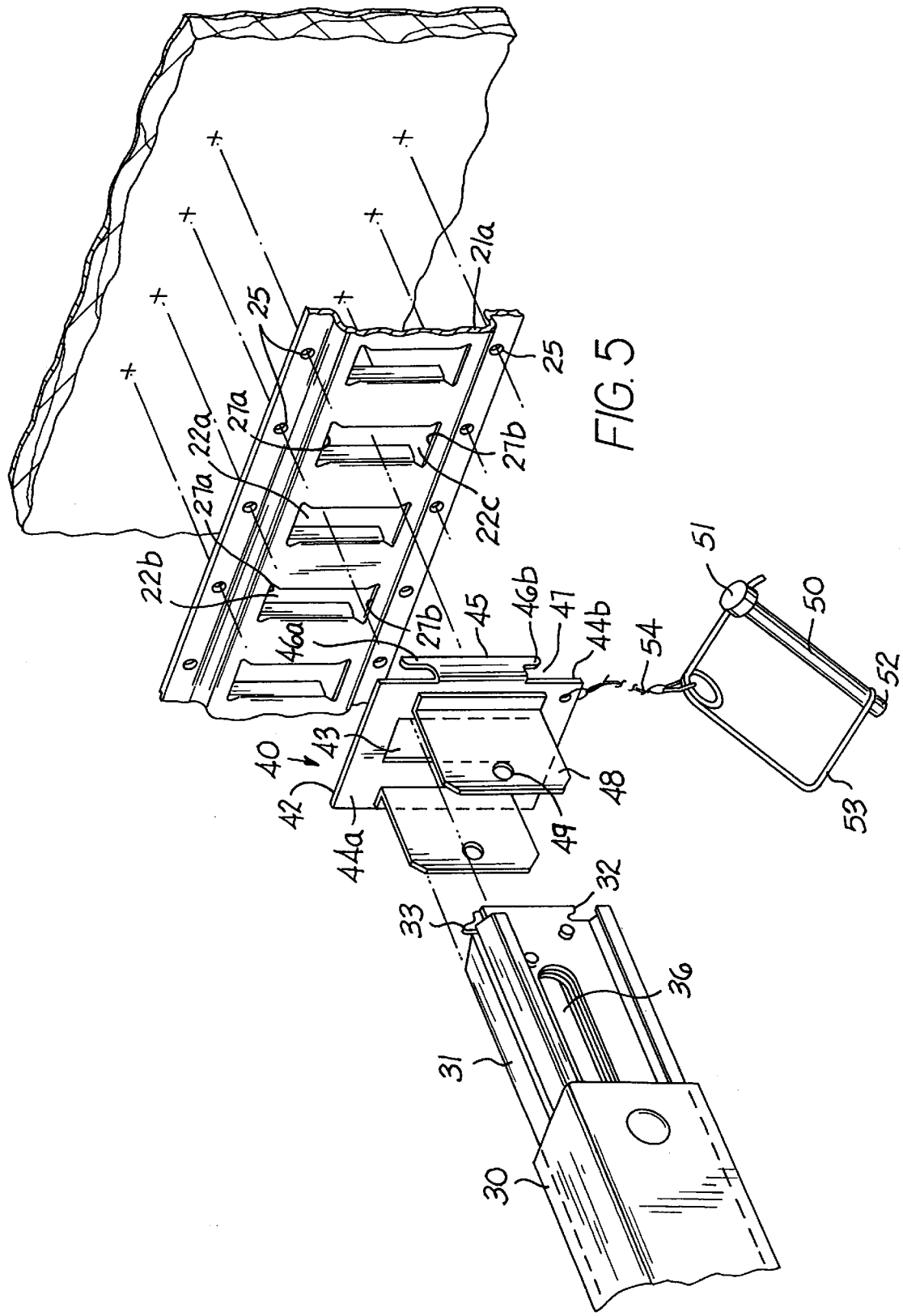
FIG. 5 is an exploded perspective view of a cargo support beam end portion and retaining bracket supported from an E-track, in accordance with the present invention.

Referring now to FIG. 5, a retaining bracket 40, according to the present invention, is illustrated in greater detail. The illustrated retaining bracket 40 includes a plate 42 with an aperture 43 formed through a medial portion thereof and has opposing front and rear faces 44a,44b, respectively. The illustrated plate 42 has a rectangular configuration; however, one skilled in the art would understand that the plate may have various configurations. The retaining bracket 40 is preferably rigid and is made from steel, aluminum, and the like. However, the retaining bracket 40 may be made from various materials including, but not limited to, plastics and other composite materials.

The aperture 43 is configured to permit the lower and upper tongues 32,33 of a cargo beam end portion 31, as described above, to cooperate with the E-track slot as described above. The illustrated plate aperture 43 has a rectangular configuration; however, one skilled in the art would understand that the aperture may have various configurations as long as the lower tongue 32 is allowed to cooperate with the E-track slot 22.

A pair of spaced apart tabs 45 extend outwardly from the rear face 44b of plate 42 with the plate aperture 43 therebetween, as illustrated. Each tab 45 has upper and lower portions 46a,46b configured to cooperate with a respective E-track slot on opposite sides of the E-track slot in which the lower and upper tongues 32,33 of beam end portion 31 are engaged. For example, in FIG. 5, E-track slot 22a cooperates with upper and lower tongues 33,32. E-track slots 22b,22c, on opposite sides of slot 22a, cooperate with respective tabs 45.

Preferably, upper tab portion 46a is longer than lower tab portion 46b to facilitate insertion and removal of each tab 45 within it respective slot 22b,22c. To secure the retaining bracket 40 to the E-track, the bracket is tilted such that both tab upper portions 46a are inserted into a respective slot 22b,22c. The retaining bracket 40 is then pushed towards the E-track such that the lower portions 46b of each tab 45 are inserted within their respective slots 22b,22c.

When the retaining bracket 40 is properly secured to the E-track 21a, the notch 47 between each tab lower portion 46b and the plate 42 rests on the lower edge 27b of its respective slot 22b,22c. The upper portion 46a of each tab is sufficiently long to prevent the retaining bracket 40 from becoming disengaged from the two slots without performing the above operations in reverse. When properly secured to the E-track 21a, the rear face 44b of the plate 42 overlies the E-track in face to face relationship. Preferably, the slot 22a, within which the beam end portion 31 is to be secured, is sufficiently exposed through the aperture 43 of retaining bracket plate 42 to permit the lower tongue 32 to cooperate with slot 22a.

Figure 6:
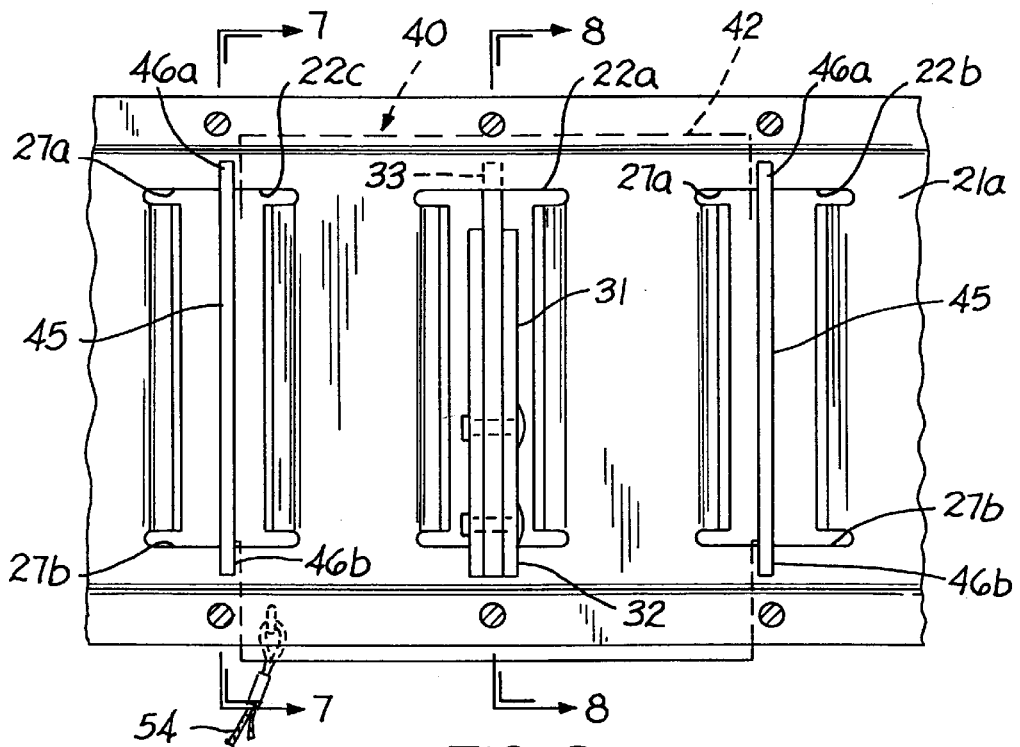
FIG. 6 is a sectional view of the retaining bracket and E-track taken along lines 6—6 in FIG. 2.
Figure 7:
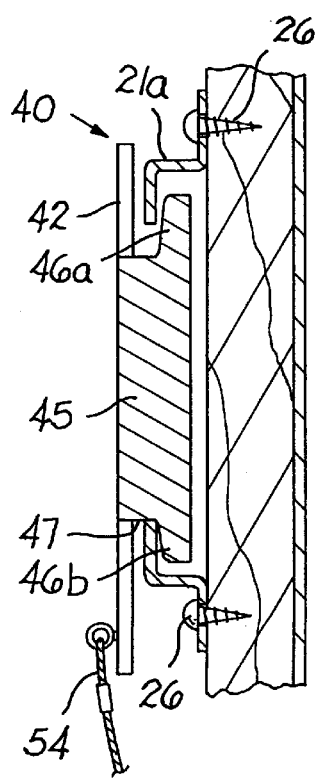
FIG. 7 is a sectional view of the retaining bracket and cooperating slot taken along lines 7—7 in FIG. 6.
Figure 8:
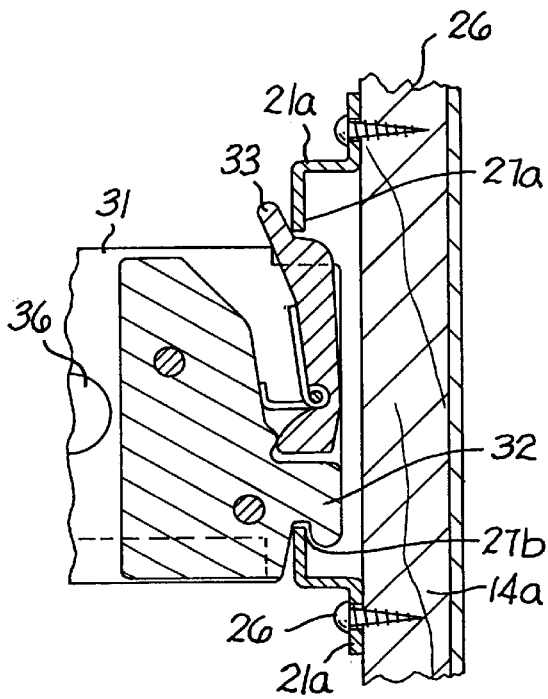
FIG. 8 is a sectional view of a beam end portion and cooperating slot taken along lines 8—8 in FIG. 6.

Referring now to FIG. 6, a retaining bracket 40 and cargo beam end portion 31 are shown engaging respective slots 22a,22b,22c in E-track 21a. As illustrated, tabs 45 cooperate with respective slots 22b,22c on opposite sides of the slot 22a within which lower and upper tongues 32,33 are cooperating. FIG. 7 illustrates tab 45 cooperating with slot 22c. The notch 47 between tab lower portion 46b and the plate 42 is shown cooperating with the lower edge 27b of slot 22c. The tab upper portion 46a is shown having a length sufficient to keep the retaining bracket 40 from becoming disengaged from the E-track 21a. FIG. 8 illustrates lower and upper tongues 32,33 cooperating with slot 22a as described above.

Referring back to FIG. 5, each retaining bracket 40 also includes a pair of spaced apart flanges 48 extending outwardly from the front face 44a of the plate 42 with the plate aperture 43 therebetween. The flanges 48 are configured to receive the illustrated beam end portion 31 therebetween. Once the beam end portion 31 is properly secured within a slot 22a, a locking pin 50 is inserted though an aperture 49 in each flange 48 and through web aperture 36 in the beam end portion 31. In the illustrated embodiment, web aperture 36 is elongated. This allows the beam end portion 31 to slide in and out of cargo beam 40 in a telescoping manner and still permit a locking pin 50 to be engaged therethrough. Preferably the locking pin 50 is made from steel or aluminum; however, other materials may be utilized.

In the illustrated embodiment, the locking pin 50 is cylindrical with an enlarged head 51 at one end and a circumferential groove 52 adjacent the opposite end. The enlarged head 51 permits the locking pin to be inserted and removed through the flange apertures 49 and web aperture 36 in only one direction. In the illustrated embodiment, an arcuate spring clip 53 is configured to extend around the beam and cooperate with the circumferential groove 52, and serves as means for preventing the locking pin 50 from inadvertently disengaging from the flange and web apertures 49 and 36, respectively. When the spring clip 53 is seated within the circumferential groove 52, the locking pin 50 is restrained from backing out of flange apertures 49 and web aperture 36. However, other means for restraining locking pin 50 from backing out of the flange and web apertures 49,36 can be utilized.

Preferably, the spring clip 53 is secured to the retaining bracket 40 for the purpose of keeping the locking pin 50 in a handy position and to prevent it from becoming misplaced. In the illustrated embodiment, the locking pin 50 is secured to the bracket 40 via a small cable 54 attached to the front face 44a of plate 42, and serves as means for retaining the locking pin adjacent the plate when the locking pin is not inserted within the flange and web portion apertures 49 and 36, respectively. However, other means for securing locking pin 50 to the retaining bracket 40 can be utilized.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A retaining bracket adapted for preventing an end portion of a cargo support beam from dislodging from a slot in a longitudinally extending track having a plurality of spaced apart slots along its longitudinal extent, said retaining bracket comprising:

a plate with an aperture formed through a medial portion thereof and having opposing front and rear faces, said plate aperture configured to permit said beam end portion to pass therethrough and cooperate with said slot in said track;

a pair of spaced apart tabs extending outwardly from said rear face with said plate aperture therebetween, each tab having an upper and a lower notched portion configured to engage a respective upper and lower portion of a respective one of said slots adjacent said slot in which the end portion cooperates and thereby secure said plate to said track;

a pair of spaced apart flanges extending outwardly from said front face with said plate aperture therebetween, said flanges configured to receive said beam end portion therebetween, each flange having an aperture therethrough; and a locking pin having opposite ends and configured to be removably inserted within said flange apertures and so as to extend between said pair of flanges and through an aperture in said end portion of said cargo support beam, thereby preventing said beam end portion from dislodging from its cooperating slot.

2. A retaining bracket according to claim 1 wherein each of said pair of spaced apart tabs extend generally perpendicular to said plate rear face.

3. A retaining bracket according to claim 1 wherein each of said pair of spaced apart flanges extend generally perpendicular to said plate front face.

4. A retaining bracket according to claim 1 further comprising means for preventing said locking pin from inadvertently disengaging from said flange and end portion apertures.

5. A retaining bracket according to claim 4 wherein said means for preventing said locking pin from inadvertently disengaging from said flange and end portion apertures comprises an arcuate member cooperating with a groove adjacent one of said locking pin ends.

6. A retaining bracket according to claim 1 further comprising means for retaining said locking pin adjacent said plate when said locking pin is not inserted within said flange apertures and said end portion aperture.

7. A cargo transport assembly comprising:

a cargo compartment having a pair of opposite walls;

a pair of longitudinally extending tracks mounted on said walls in opposing relationship to each other, with said tracks being horizontally aligned and each track having a plurality of spaced apart slots along the longitudinal extent thereof;

at least one beam having opposite end portions, each end portion cooperating with a said slot in a respective one of said opposing tracks to thereby support said beam in a horizontal position between the tracks, each beam having a web portion adjacent each end portion, with each web portion having an aperture therethrough; and a pair of retaining brackets releasably interconnecting each end portion of the one beam with the associated track and each bracket comprising:

a plate having an aperture through a medial portion thereof and having opposing front and rear faces, said plate being positioned to overlie the associated track with the plate aperture being aligned with the slot which cooperates with the associated end portion of the one beam, and so that the end portion of the one beam extends through the plate aperture, a pair of spaced apart tabs extending outwardly from said rear face with said plate aperture therebetween, said tabs cooperating with respective ones of said track slots on opposite sides of said track slot in which said respective beam end portion is cooperating, thereby securing said bracket to said track, a pair of spaced apart flanges extending outwardly from said front face with said plate aperture therebetween, said flanges configured to receive a respective said beam end portion therebetween, each flange having an aperture therethrough, and a locking pin removably inserted through said flange apertures and said web aperture to releasably interconnect the one beam to the associated track.

8. A cargo transport assembly according to claim 7 wherein each of said pair of spaced apart tabs extending outwardly from said rear face has an upper and a lower notched portion engaging a respective upper and lower portion of a respective one of said track slots.

9. A cargo transport assembly according to claim 7 wherein each of said pair of spaced apart tabs extend generally perpendicular to said rear face.

10. A cargo transport assembly according to claim 7 wherein each of said pair of spaced apart flanges extend generally perpendicular to said front face.

11. A cargo transport assembly according to claim 7 further comprising means for preventing said locking pin from disengaging from said flange and web apertures.

12. A cargo transport assembly according to claim 7 further comprising means for attaching said locking pin to said respective bracket when not in use.

13. A cargo transport assembly comprising:

a longitudinally extending track having a plurality of spaced apart slots along the longitudinal extent thereof;

at least one cargo support beam having an end portion cooperating with a said slot in said track to thereby support said beam, said at least one cargo support beam having a web portion with an aperture therethrough adjacent said end portion; and a retaining bracket releasably interconnecting said end portion of said at least one cargo support beam with said track and comprising:

a plate having an aperture through a medial portion thereof and having opposing front and rear faces, said plate being positioned to overlie said track with the plate aperture being aligned with the slot which cooperates with the end portion of the said at least one cargo support beam, and so that the end portion of the one beam extends through the plate aperture, a pair of spaced apart tabs extending outwardly from said rear face with said plate aperture therebetween, said tabs cooperating with respective ones of said track slots on opposite sides of said track slot in which said respective beam end portion is cooperating, thereby securing said bracket to said track, a pair of spaced apart flanges extending outwardly from said front face with said plate aperture therebetween, said flanges configured to receive said beam end portion therebetween, each flange having an aperture therethrough, and a locking pin removably inserted through said flange apertures and said web aperture to releasably interconnect the one beam to the associated track.

14. A cargo transport assembly according to claim 13 wherein each of said pair of spaced apart tabs extending outwardly from said rear face has an upper and a lower notched portion engaging a respective upper and lower portion of a respective one of said track slots.

15. A cargo transport assembly according to claim 13 wherein each of said pair of spaced apart tabs extend generally perpendicular to said rear face.

16. A cargo transport assembly according to claim 13 wherein each of said pair of spaced apart flanges extend generally perpendicular to said front face.

17. A cargo transport assembly according to claim 13 further comprising means for preventing said locking pin from disengaging from said flange and web apertures.

18. A cargo transport assembly according to claim 13 further comprising means for attaching said locking pin to said bracket when not in use.

* * * * *